A. HOEFFER & A. SENEFF.
Friction-Clutch for Foot Power.
No. 209,395.                                    Patented Oct. 29, 1878.
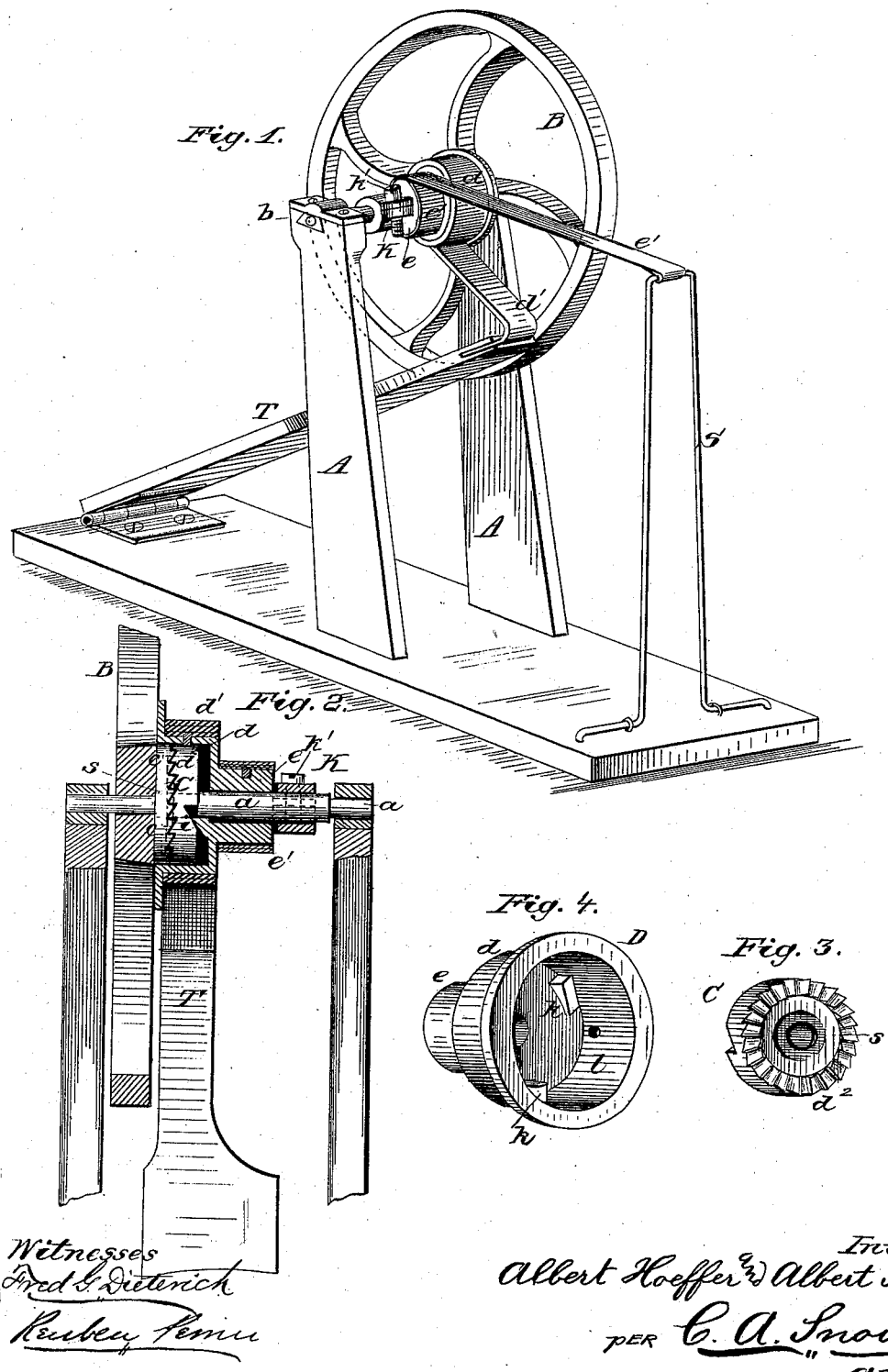
Witnesses
Fred G. Dieterich
Reuben Penn
Inventors
Albert Hoeffer & Albert Seneff,
per C. A. Snow & Co.
attys.

UNITED STATES PATENT OFFICE.

ALBERT HOEFFER AND ALBERT SENEFF, OF POTTSVILLE, PENNSYLVANIA; SAID SENEFF ASSIGNOR TO SAID HOEFFER.

IMPROVEMENT IN FRICTION-CLUTCHES FOR FOOT-POWERS.

Specification forming part of Letters Patent No. 209,395, dated October 29, 1878; application filed May 3, 1878.

*To all whom it may concern:*

Be it known that we, ALBERT HOEFFER and ALBERT SENEFF, of Pottsville, in the county of Schuylkill and State of Pennsylvania, have invented certain new and useful Improvements in Friction-Gears for Foot-Powers; and we do hereby declare that the following is a full, clear, and exact description thereof, which will enable others skilled in the art to which it appertains to make and use the same, reference being had to the accompanying drawings, which form a part of this specification, and in which—

Figure 1 is a perspective view. Fig. 2 is a vertical cross-section. Fig. 3 is a perspective view of the collar C; and Fig. 4 is a similar view of the pulley D detached.

Similar letters of reference denote corresponding parts in all the figures.

This invention relates to an improved friction-gear for foot-powers; and it consists in the construction and arrangement of parts hereinafter more fully shown and described.

In the drawings, A A are standards, having bearings $b\ b$ for the shaft $a$. B is the fly-wheel, which is secured upon shaft $a$. It has upon the side of its hub a circumferential notched rim, $c$, engaging with a similarly-constructed rim, $d^2$, upon a flat collar, C, which is loose upon shaft $a$. D is a cone-pulley having two faces, $d\ e$, for belts or straps $d^1\ e'$, which are wound in opposite directions, the former and heavier being attached to a treadle, T, and the latter to a suitably-arranged tension-spring, S. Both belts may be, and are preferably, wound three, four, or more times around the pulley, for the purpose of obtaining greater leverage and power in operating the machine.

Collar C has upon the side opposite the notched rim $d^2$ three or more inclined recesses, $i\ i$, into which fit corresponding projections $k\ k$ upon the side of pulley D, which is provided with a large recess, $l$, to accommodate the edge of collar C, as shown.

K is a clamp, secured upon shaft $a$ by a set-screw, $k'$, for the purpose of adjusting pulley D in relation to collar C, and preventing it from sliding so far upon the shaft as to prevent disengagement between the projections $k\ k$ and inclined recesses $i\ i$; and $s$ is a small rubber washer adjusted between the hub of the balance-wheel and the collar C, for the purpose of preventing friction during the operation.

The operation is as follows: By pressing the treadle in a downward direction the belt $d^1$ is unwound, thus rotating pulley D and winding strap $e'$. By the rotation of pulley D the pressure upon the inclined projections $k\ k$ of pulley D upon the inclined sides or recesses $i\ i$ of collar C forces the latter sidewise, thus causing the fly-wheel and shaft to rotate by the notched hub $c$ engaging with the notched collar C. When the pressure upon the treadle is released, the continued revolution of the fly-wheel with its notched hub disengages the latter from the collar C, which is now turned in a reverse direction by the pulley D actuated by spring S, the same motion serving to unwind belt $e'$ and wind belt $d^1$ for a repetition of the operation.

It is obvious that a simple collar having a notched rim, and secured rigidly upon the shaft independent of the fly-wheel, may take the place of the notched hub of the latter.

Having thus described our invention, we claim and desire to secure by Letters Patent of the United States—

In combination with the shaft $a$ and notched hub or collar $c$, secured rigidly thereupon, the loose collar C, having notched rim $d^2$, and inclined recesses $i\ i$, rubber washer $s$, loose cone-pulley D, having recess $l$ and inclined projections $k\ k$, straps $d^1\ e'$, treadle T, and spring S, all combined, arranged, and operating substantially as described, for the purpose herein shown and specified.

In testimony that we claim the foregoing as our own we have hereto affixed our signatures in presence of two witnesses.

ALBERT HOEFFER.
ALBERT SENEFF.

Witnesses:
J. KURTEN,
H. K. WESTON.